UNITED STATES PATENT OFFICE 2,572,843

LINEAR POLYMERIC ALPHA-AMINO CARBOXYLIC ACID POLYAMIDES FROM SPIRO-N-CARBOANHYDRIDES

Robert Neal MacDonald, New Castle, Del., assignor to E. I. du Pont de Nemours & Company, Wilmington, Del., a corporation of Delaware No Drawing. Application August 5, 1947, Serial No. 766,458

6 Claims. (Cl. 260—78)

This invention relates to new types of polyamides and the intermediates therefor, and more particularly to N-carboanhydrides of alphaamino acids of unusual ring structure and the polymers derived therefrom.

This invention has as an object the preparation of new intermediates for condensation polymers. Another object is the preparation of new polymers, including copolymers. Other objects will appear hereinafter.

These objects are accomplished by the following invention of N-carboanhydrides of alphaamino acids wherein the carbon between the amino nitrogen and the acyl carbon is a spiro carbon, i. e. the carbon forms the one common member of two rings—one being the N-carboanhydride ring. A further phase of the invention comprises the linear polymers, including copolymers, of the condensation, with carbon dioxide evolution, of these N-carboanhydrides.

These N-carboanhydrides may be prepared by the reaction of the alpha-amino acid having the alpha carbon a member of a ring with ethyl chloroformate, then reacting the carboethoxy derivative with thionyl chloride to form the corresponding acid chloride which splits out ethyl chloride to yield the desired product. However, the route through the carbobenzyloxy derivative is preferred because of greater ease of handling and greater reaction efficiency. They may also be prepared by reacting the amino acid salt with phosgene.

The monomer phase of the invention is illustrated by the following example but the invention is not limited to this particular modification.

EXAMPLE I

A. *Preparation of N-carbobenzyloxy-1-aminocyclohexanecarboxylic acid*

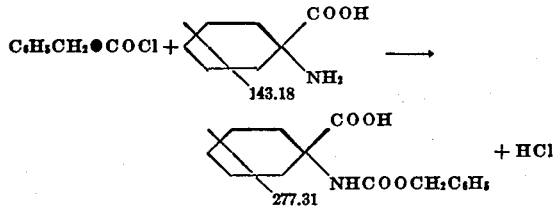

In a one-liter, three-necked flask equipped with a stirrer and two dropping funnels are placed 71.6 g. (0.5 mole) of 1-aminocyclohexanecarboxylic acid and 245 ml. (0.5 mole) of 2.038 N sodium hydroxide. While cooling this solution in an ice bath and continuously stirring it, 107.7 g. (0.5 mole) of carbobenzyloxychloride and 122.7 ml. (0.5 mole) of 4.076 N sodium hydroxide are added simultaneously from the two dropping funnels over a period of one hour. The acid chloride addition is started slightly ahead of that of the sodium hydroxide, the rates being adjusted so that the addition of both ends together. Stirring at ice-bath temperature is continued for two hours, after which the reaction mixture is filtered and the filtrate extracted four times with ether. While kept at 0° C. by external cooling, the solution is neutralized with 49 ml. of concentrated hydrochloric acid, whereupon a white precipitate forms. It is separated by filtration, washed with cold distilled water until free from chloride ion, and dried over calcium chloride in a vacuum desiccator. N-carbobenzyloxy-1-aminocyclohexanecarboxylic acid, melting at 154.8–156° C., is thus obtained, 72.7 g. or 52% of theory.

Analysis—Calculated for $C_{15}H_{19}NO_4$: Neutral equivalent 277.3. Found: Neutral equivalent, 275.4, 276.4.

B. *Preparation of N-carboanhydride of 1-aminocyclohexanecarboxylic acid*

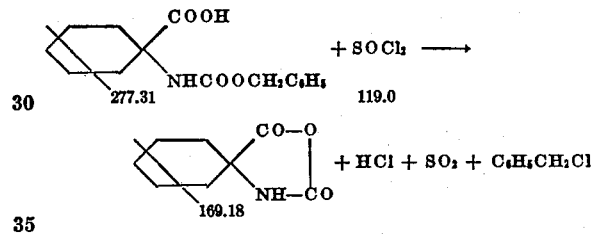

Fifty g. (0.181 mole) of N-carbobenzyloxy-1-aminocyclohexanecarboxylic acid is mixed at room temperature with 119 g. (one mole) of thionyl chloride in a 200 ml. distilling flask protected with tubes containing a drier. Evolution of sulfur dioxide and hydrogen chloride begins within one minute, and solution is complete within 10 minutes. The reaction mixture is allowed to stand overnight, after which it is still a clear, amber color. The excess thionyl chloride is removed under reduced pressure, leaving a solid product. This crude material is washed with petroleum ether in a Buchner funnel under anhydrous conditions, 27 g. (88.5% of theory) of the N-carboanhydride of 1-aminocyclohexanecarboxylic acid being thus obtained. If a purer product is desired, it may be taken up in 60 ml. of boiling methylene chloride, treated with decolorizing charcoal at the boil, filtered hot, 50 ml. of petroleum ether added, and the resulting solution cooled at Dry-Ice temperature overnight. The crystalline product is then filtered off, washed first with a mixture of four parts petroleum ether to one part methylene chloride by volume, and washed finally with petroleum ether alone. After drying, 17.1 g. (56% of theory) of snow-white crystals melting sharply at 114.8–115.2° C. is obtained.

Analysis—Calculated for $C_8H_{11}NO_3$: C, 56.79; H, 6.55; N, 8.28. Found: C, 57.09; H, 6.66; N, 8.20.

The following examples illustrate the polymer phase of the invention which is not, however, limited to the particular modifications described. Parts are by weight.

EXAMPLE II

*Polymerization of the N-carboanhydride of 1-aminocyclohexanecarboxylic acid*

The N-carboanhydride of 1-aminocyclohexanecarboxylic acid is heated under nitrogen in an open, tubular container to 160° C. After two minutes at this temperature, carbon dioxide begins to be evolved from the clear, colorless melt. Within 25 minutes the liquid begins to thicken, and within two hours it becomes opaque and finally solid. The polymeric product thus obtained is a powdery, white solid which is infusible at 400° C. It is soluble in concentrated sulfuric acid and insoluble in 98% formic acid, saturated calcium chloride methanol solution, 50% lithium bromide solution, water, saturated calcium chloride/formic acid solution, 85% syrupy phosphoric acid, 4 N sodium hydroxide, and concentrated hydrochloric acid. This solubility behavior indicates it to have a high degree of polymerization.

When the above N-carboanhydride is heated at 146° C. polymer formation is greatly accelerated when 0.2% of tetramethylenediamine is included.

EXAMPLE III

*Copolymer from the N-carboanhydrides of alpha-aminoisobutyric acid and 1-aminocyclohexanecarboxylic acid*

A mixture of two parts of the N-carboanhydride of alpha-aminoisobutyric acid and one part of the N-carboanhydride of 1-aminocyclohexanecarboxylic acid is heated under nitrogen to 160° C. in an open glass or glass-lined vessel. A clear melt is obtained almost at once. Within two minutes vigorous evolution of carbon dioxide sets in; within 25 minutes the liquid becomes so viscous that it begins to foam, and after 3½ hours it becomes solid. Heating is continued for a total time of 4½ hours. The polymer so obtained is a white, amorphous powder which is infusible and darkens only in spots after one minute at 400° C. It has a nitrogen content of 14.65%, as compared with the calculated value of 14.55%, and an intrinsic viscosity of 0.13 and softens at 200° C. then hardens and becomes infusible finally decomposing at 320° C. This polymer gives a positive biuret test of lavender tint and is soluble in chloral hydrate, choloform, m-cresol, phenol, and benzyl alcohol. It is swollen by benzene and cyclohexane and is insoluble in tertiary butanol, concentrated hydrochloric acid, 98% formic acid, and water. End-group titrations indicate an amino content of $330 \times 10^{-6}$ per gram of polymer. This indicates a molecular weight of about 3000 and a degree of polymerization (DP) of 27. Infra-red absorption diagrams show the absence of diketopiperazine-type structures.

EXAMPLE IV

*Copolymer from the N-carboanhydrides of dl-beta-phenylalanine and 1-aminocyclohexanecarboxylic acid*

A mixture of three parts each of the N-carboanhydrides of dl-beta-phenylalanine and 1-aminocyclohexanecarboxylic acid is heated under nitrogen at 146° C. Vigorous evolution of carbon dioxide occurs at once in the clear melt. After heating for ten minutes at about 150° C., extensive foaming sets in; the melt then thickens and within 35 minutes it solidifies. Heating is terminated after a total time of 80 minutes. The white, powdery polymer obtained is soluble in chloroform, hot benzene, and m-cresol, softens at 160° C. and has an intrinsic viscosity of 0.09. A clear, colorless, self-supporting film was obtained by pressing at 240° C. under 5000 p. s. i. pressure.

EXAMPLE V

*Copolymer from the N-carboanhydrides of glycine and 1-aminocyclohexanecarboxylic acid*

Two parts of the N-carboanhydride of glycine and one part of the N-carboanhydride of 1-aminocyclohexanecarboxylic acid are ground together in a mortar and then heated under nitrogen at 121° C. for five hours. The mixture sinters at the start but does not melt. The product is insoluble in boiling m-cresol and is infusible on a copper block, charring at 320° C.

EXAMPLE VI

*Copolymer from the N-carboanhydrides of 1-aminocyclohexanecarboxylic acid and alpha-aminocyclohexylacetic acid*

A mixture of equal parts of the N-carboanhydrides of 1-aminocyclohexanecarboxylic acid and alpha-aminocyclohexylacetic acid is heated under nitrogen at 146° C. Vigorous evolution of carbon dioxide occurs almost at once in the clear melt (after 1–2 minutes' heating). After 10–15 minutes' heating evolution of carbon dioxide ceases and the melt becomes solid. Heating is terminated after one hour. The white, powdery polymer obtained is soluble in m-cresol, softens at 180° C. and exhibits an intrinsic viscosity of 0.09. The polymer was partially soluble in benzene and gave coherent films therefrom.

The present invention is generic to N-carboanhydrides of alpha-amino acids wherein the 4-carbon of the carboanhydride or oxazolidine ring is a spiro carbon, i. e. the 4-carbon is the one annular member common to two rings. The size of the second ring, i. e. the ring other than the oxazolidine ring, is immaterial, but it will normally have from 5 to 7, and preferably 6, members since others are rare and difficultly formed. Such ring is preferably carbocyclic, but it may be heterocyclic, in which case the hetero atoms may be oxygen, nitrogen, or sulfur; also, it may have substituents such as halogen, alkyl, alkoxy, and the like which are non-reactive in the polymer-forming condensation.

In addition to the acid of the examples, there may be employed, with formation of the corresponding N-carboanhydrides, 3-aminotetrahydrothiophene-3-carboxylic acid, 4-amino-1-methylpiperidine-4-carboxylic acid, 3-aminotetrahydrofuran-3-carboxylic acid, 1-amino-2-methylcyclobutanecarboxylic acid, 1-amino-2-methylcyclohexanecarboxylic acid, 1-amino-3-methylcyclohexanecarboxylic acid, 1-amino-4-methylcyclohexanecarboxylic acid, 1-amino-3,3,5- trimethylcyclohexanecarboxylic acid, 1-aminocyclopentanecarboxylic acid, 1-aminocycloheptanecarboxylic acid, and 1-amino-4-nitrocyclohexanecarboxylic acid.

The N-carboanhydrides of this invention may be systematically described as 2,5-diketooxazolidines having the 4-carbon of the carboanhydride or oxazolidine ring a spiro carbon, i. e. the one common member of two rings.

The N-carboanhydrides of this invention exhibit marked superiority in heat stability over the known N-carboanhydrides of amino acids. This superiority reduces the difficulty of isolation and handling, and it enhances their utility as polyamide intermediates since it is carried into the resulting polymers even though higher temperatures may be required for elimination of carbon dioxide. The N-carboanhydrides of this invention are thus useful in the preparation of polyamides and copolyamides through polymerization, via carbon dioxide evolution, with themselves or other N-carboanhydrides.

This invention is also generic to the polymers obtained from the N-carboanhydrides of the present invention, including the above-mentioned specific N-carboanhydrides. These polymers are linear condensation polyamides characterized by recurring alpha-amino acid units 30 to 100% of which are units wherein the alpha carbon is a member of a ring preferably of 5 to 7 members and preferably carbocyclic which ring is, apart from said alpha carbon, external to the polymer chain.

These polymers are prepared optionally in the presence of an organic solvent, by the condensation polymerization (thermal or initiated by water, ethanol, phenols, organic acids, or amino hydrogen-containing amines), with carbon dioxide evolution, of compositions all of the reactants of which are amino acid N-carboanhydrides and which contain from 30 to 100%, by weight of the reactants, of one or more alpha-amino acid N-carboanhydrides having the 4-carbon of the N-carboanhydride or oxazolidine ring a spiro carbon, i. e. the one common member of two rings. The spiro N-carboanhydride must make up at least 30% of the polymerizable components in order that the polymer may exhibit in effective measure the unique properties of the polymers of this invention.

The preferred procedure is to heat the selected spiro amino acid N-carboanhydride-containing composition under oxygen-free conditions, desirably under an inert gas such as nitrogen or carbon dioxide, in a vessel adapted to permit escape of carbon dioxide, to that temperature at which carbon dioxide is evolved at an appreciable rate. This varies somewhat with different compounds but is usually in the neighborhood of 70–200° C., and is generally above the melting point of the spiro amino acid N-carboanhydrides. Heating is continued until carbon dioxide evolution ceases with the temperature maintained at the gas evolution point or slightly, 10–20° C., above it. The time of the reaction may be shortened or the temperature necessary may be lowered, or both, by the use of catalysts for the decomposition of the N-carboanhydrides, such as water, ethanol, phenols, organic acids such as adipic, or amino-hydrogen-containing amines such as tetramethylenediamine.

The polymers of this invention exhibit marked thermal stability over the previously known amino acid polyamides; thus, they do not decompose at temperatures as high as 350–400° C. Their solubility in organic solvents varies considerably, ranging from high insolubility when a single N-carboanhydride is employed to fairly wide solubilities as the amount of other amide-forming ingredient is increased, although there are some exceptions to the latter generality. The insoluble types may be used as fillers, delusterants for nylon, and pigment carriers. The soluble types may be used to produce films and artificial fibers. The interpolyamides of this invention are soluble in one or more of the following: sulfuric acid; hot benzene; chloral hydrate; tetralin; five and six-membered alicyclic ketones liquid below 75° C., e. g. cyclopentanone and cyclohexanone; halogenated hydrocarbons liquid below 75° C., e. g. methylene chloride, chloroform, carbon tetrachloride, ethylene dichloride, allyl iodide, benzyl chloride, and chlorobenzene; and phenols and thiophenols liquid below 75° C., e. g. phenol, chlorophenol, thiophenol, resorcinol monomethylether, and m-cresol.

The term "intrinsic viscosity" is used in the specification and claims in its conventional meaning as set forth by Ewart in Advances in Colloid Science, vol. 11, page 209.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A film forming, linear polyamide of intrinsic viscosity of at least 0.09 and the polymer chain of which is an open chain, which polymer is composed of recurring alpha-amino carboxylic acid units 30–100% of which are units wherein the alpha carbon is a member of a 5 to 7-membered carbocyclic ring otherwise external to the polymer chain.

2. A film forming, linear polyamide of intrinsic viscosity of at least 0.09 and the polymer chain of which is an open chain, which polymer is composed essentially of recurring 1-aminocyclohexanecarboxylic acid,

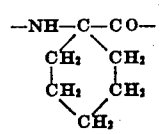

units.

3. A film forming linear polyamide of intrinsic viscosity of at least 0.09 and the polymer chain of which is an open chain, which polymer is composed essentially of recurring alpha-amino carboxylic acid units 30–100% of which are 1-aminocyclohexanecarboxylic acid,

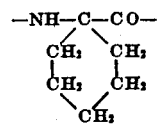

units.

4. A film forming linear polyamide of intrinsic viscosity of at least 0.09 and the polymer chain of which is an open chain, which polymer is composed essentially of recurring alpha-amino carboxylic acid units 30–100% of which are units wherein the alpha carbon is a member of a six carbon saturated hydrocarbon ring otherwise external to the polymer chain.

5. A film forming linear polyamide of intrinsic viscosity of at least 0.09 and the polymer chain of which is an open chain, which polymer is composed essentially of recurring alpha-amino carboxylic acid units 30–100% of which are units wherein the alpha carbon is a member of a five to seven membered saturated hydrocarbon ring otherwise external to the polymer chain.

6. A film forming, linear polyamide of intrinsic viscosity of at least 0.09 and the polymer chain of which is an open chain, which polymer is composed essentially of recurring alpha-amino carboxylic acid units 30–100% of which are units wherein the alpha carbon is a member of a six carbon saturated carbocyclic ring otherwise external to the polymer chain.

ROBERT NEAL MacDONALD.

REFERENCES CITED

The following references are of record in the file of this patent:

UNITED STATES PATENTS

| Number | Name | Date |
|---|---|---|
| 2,327,162 | Baldwin et al. | Aug. 17, 1943 |
| 2,333,752 | Ufer | Nov. 9, 1943 |
| 2,352,152 | Kaplan | June 20, 1944 |
| 2,406,186 | Baldwin | Aug. 20, 1946 |

OTHER REFERENCES

Bucherer et al.: Journal für Praktische Chemie, vol. 140, 1934, pp. 129, 130, 131, 148 and 149.

Bibliography of Scientific and Industrial Reports, vol. 3, No. 11, Dec. 13, 1946, pp. 834 to 835.

Woodward et al.: Jour. Am. Chem. Soc., vol. 69, pages 1551–1552, June 1947.

Leuchs et al.: Ber. deu. chem. Gesel, vol. 41, pages 1721–1726 (1908).